(12) United States Patent
Chopard et al.

(10) Patent No.: US 11,326,839 B2
(45) Date of Patent: May 10, 2022

(54) THERMAL EXCHANGER-ACCUMULATOR (71) Applicant: Hutchinson, Paris (FR)

(72) Inventors: Fabrice Chopard, Saint-Martin-d'Hères (FR); Boris Chauvet, Ferrières (FR)

(73) Assignee: Hutchinson, Paris (FR)

(*) Notice: Subject to any disclaimer, the term of this patent is extended or adjusted under 35 U.S.C. 154(b) by 439 days.

(21) Appl. No.: 16/307,899

(22) PCT Filed: Jun. 9, 2017

(86) PCT No.: PCT/FR2017/051482
§ 371 (c)(1),
(2) Date: Dec. 6, 2018

(87) PCT Pub. No.: WO2017/212198
PCT Pub. Date: Dec. 14, 2017

(65) Prior Publication Data
US 2019/0310026 A1    Oct. 10, 2019

(30) Foreign Application Priority Data

Jun. 10, 2016  (FR) ...................... 1655394

(51) Int. Cl.
*F28D 9/00* (2006.01)
*F28D 20/02* (2006.01)
(Continued)

(52) U.S. Cl.
CPC ............. *F28D 20/02* (2013.01); *F01M 5/007* (2013.01); *F01M 5/02* (2013.01); *F01M 5/021* (2013.01);
(Continued)

(58) Field of Classification Search
CPC .. F28D 20/00; F28D 20/02; F28D 2020/0008; F28D 9/0037; F28F 3/046; F28F 9/001; F28F 2270/00
See application file for complete search history.

(56) References Cited

U.S. PATENT DOCUMENTS 9,005,533 B2 * 4/2015 Gaiser ................... F01N 3/2814
422/175
9,242,530 B2 * 1/2016 Goenka .................. B60H 1/005
(Continued)

FOREIGN PATENT DOCUMENTS

EP    0 165 179 A1   12/1985
FR    3 000 188 A1    6/2014
(Continued)

*Primary Examiner* — Jerry-Daryl Fletcher
*Assistant Examiner* — Daniel C Comings
(74) *Attorney, Agent, or Firm* — Blank Rome LLP (57) ABSTRACT

The invention relates to a heat exchanger comprising a first free space (7) for a first fluid (3), a thermally conductive wall (11) which, at least locally, delimits said first free space (7), in such a way that an exchange of heat can occur between the first fluid and the thermally conductive wall (11) which is hollow and encloses a material (13) for storing thermal energy by accumulation of latent heat, by heat exchange with at least the first fluid. The first free space (7) is divided into at least two separated channels (7a, 7b) in which two streams of the first fluid (3) can circulate at the same time but separately, the thermally conductive wall (11) which encloses the thermal energy storage material (13) being interposed between the two channels (7a, 7b).

6 Claims, 4 Drawing Sheets

(51) Int. Cl.
   *F28F 3/04*     (2006.01)
   *F01M 5/00*    (2006.01)
   *F28F 9/00*     (2006.01)
   *F16H 57/04*   (2010.01)
   *F01M 5/02*    (2006.01)
   *F01P 7/00*     (2006.01)
   *F01P 3/00*     (2006.01)
   *F28D 20/00*   (2006.01)
   *F28D 21/00*   (2006.01)

(52) U.S. Cl.
   CPC ............ *F01P 7/00* (2013.01); *F16H 57/0412* (2013.01); *F28D 9/0037* (2013.01); *F28D 9/0062* (2013.01); *F28D 9/0093* (2013.01); *F28F 3/046* (2013.01); *F28F 9/001* (2013.01); *F01P 3/00* (2013.01); *F28D 2020/0008* (2013.01); *F28D 2020/0013* (2013.01); *F28D 2021/0089* (2013.01); *F28F 2270/00* (2013.01); *Y02E 60/14* (2013.01)

(56) References Cited

U.S. PATENT DOCUMENTS

| | | | |
|---|---|---|---|
| 9,273,907 B2 * | 3/2016 | Dinulescu | F28F 9/001 |
| 2010/0032148 A1 * | 2/2010 | Bermhult | F28F 3/046 |
| | | | 165/166 |
| 2010/0223949 A1 | 9/2010 | Higashiyama et al. | |
| 2010/0307180 A1 | 12/2010 | Yamada et al. | |
| 2015/0198383 A1 * | 7/2015 | Kitoh | F28D 20/02 |
| | | | 165/10 |

FOREIGN PATENT DOCUMENTS

| | | |
|---|---|---|
| FR | 3 025 596 A1 | 3/2016 |
| FR | 3 025 873 A1 | 3/2016 |
| JP | 2006-226628 A | 8/2006 |
| WO | WO 89/00664 A1 | 1/1989 |
| WO | WO 2010/150774 A1 | 12/2010 |

* cited by examiner

THERMAL EXCHANGER-ACCUMULATOR

The present invention relates to the field of thermal management.

This applies in particular to a thermal exchanger for implementing an exchange of thermal energy with at least a first fluid or between a first fluid and a second fluid, an element in the general shape of a polygonal plate for providing a hollow wall of this thermal exchanger, a first set comprising several such assembled elements, a second set comprising the above-mentioned thermal exchanger, with all or part of its characteristics, and a thermally insulating housing containing same, and a thermal management installation provided with said thermal exchanger.

The patent application publications EP165179 and WO1989000664 respectively provide for a plate thermal exchanger and a tubular thermal exchanger.

A thermal exchanger is therefore known which comprises:
at least one first free space for a (first) fluid,
at least one (first) thermally conductive wall that:
at least locally limits said at least one first free space, so that a heat exchange can occur between said first fluid, and
is hollow and encloses a material for storing thermal energy by accumulation of latent heat (such as PCM), in thermal exchange with at least said first fluid, thereby providing a thermal energy storage function.

In this context, it may happen that a fluid, such as the first one here, has more to expect in the thermal exchanger, in terms of temperature change, from the material for storing thermal energy than from an exchange with another fluid. In addition, the optimised thermal management of an installation, and trying to avoid unnecessary loss of thermal energy, are considerations to be taken into account.

In this case, it is proposed that said first free space should be divided into at least two (sub)-channels in the thermal exchanger, where the two (a priori generally parallel) streams of the first fluid can circulate at the same time, with the thermally conductive wall containing the material for storing thermal energy being then interposed between said two (sub)-channels.

It may then also occur that at some point in time, this first fluid is in a position to release, or in need of having to release, a thermal energy that a second fluid may subsequently require, and/or that some fluids are at one time to be heated and at another time to be cooled.

It is within this framework that it is proposed here to implement a heat exchange between such first and second fluids, proposing that the thermal exchanger should also comprise:

at least one second free space for the second fluid, in such a way that said first and second fluids circulate in the first and second free space(s), respectively, and an additional thermally conductive wall separating said first and second free spaces, in such a way that heat exchange between the first fluid and second fluid occurs through said additional thermally conductive wall.

A priori, this additional thermally conductive wall will be devoid of material for storing thermal energy.

And to also optimize heat exchange, manufacture and use, it is proposed that the additional thermally conductive wall should also be hollow, i.e. having a double wall in which said at least one second free space for the second fluid will be defined.

To manufacture the elements of the thermal exchanger, it is also proposed to start from flat metal plates, press them to form recesses, fill the recesses of one of the plates with the material for storing thermal energy and cover them with the other plate, then fix them a priori by welding.

No need for containers for the storage material nor any other parts for closing the recesses or the volumes receiving this material.

When it is mentioned that the thermal exchanger includes plates having inner faces with recesses, it may be only one plate folded back on itself.

To promote the rigidity of the plates while taking advantage of the bumpy and hollow areas then formed, it is also proposed that said plates should include corrugated plates defining elongated channels forming the recesses where said parts of the material for storing thermal energy are arranged.

This will also be an ergonomic, fairly simple realization, which can be obtained by stamping metal plates. A maximum of two plates, without a PCM container, will suffice.

Such a solution will guide the fluid into its circulation free space, at two different levels of the thermal exchanger, typically in said first and second circulation free spaces.

As a material or materials for storing thermal energy, using at least one PCM material should therefore be favourably considered. In an alternative solution, it is possible, although not considered as preferable here, to use a device operating on the basis of reversible thermochemical reactions provided for in the TCS technology.

In any case, it is confirmed that a phase change material (MCP in French; or PCM in English), refers to a material which can change physical state, for instance between liquid and solid state, with a temperature range of, for instance −50° C. to 180° C. Thermal transfer is made by using the Latent Heat thereof.

The thermally insulating material(s) mentioned hereunder may be a "simple" insulator such as glass wool, or a foam, for example of polyurethane, or a porous thermally insulating material laid out in a vacuum envelope, to define at least one insulating panel, VIP.

"VIP" means a "controlled atmosphere" structure, i.e. either filled with a gas having a thermal conductivity lower than that of the ambient air (26 mW/m·K) or "under vacuum", i.e. under a pressure lower than the ambient pressure (therefore $<10^5$ Pa).

The cavity wall containing the material for storing thermal energy, and preferably the thermal exchanger itself, could be made of a preferably rubbery flexible material, so as to adapt to the shapes and locations of the applications for which the thermal exchanger will be used.

In particular in this case, said hollow wall, and preferably the thermal exchanger itself again, could be tubular.

Applications to hoses and other pipes in vehicles in particular are planned, including in confined areas and where weight can be a major criterion.

Such a realization could be made from a shape like a flexible flat plate rolled on itself substantially in a cylinder and fixed at its rolled ends to obtain a laterally closed tube.

Connections, differentiated for each fluid, would make it possible for said first and second fluids to get in and out. In the centre could circulate a third fluid which could also be in thermal exchange with the first or second fluid which will circulate radially closest to it.

In general, for an industrial standard for the manufacture of the element intended for the construction of a hollow wall of the aforementioned thermal exchanger, with all or part of its characteristics, a solution provides an element which comprises two identical parallel plates, two opposite edges of which are bent in the same direction and which each have recesses on the inner face and bumps on the outer face.

In one case said storage material will be housed in the face-to-face recesses of the plates, in another case the inter-plate volume will be left empty.

With the above-mentioned elements, it will also be possible to create a set wherein these stacked elements, will therefore be fixed together two by two along the folded edges, in order to define between two external faces of two elements arranged face to face, at least one free fluid space.

Thus, it will be possible to produce a modular thermal exchanger, with elementary modules that are easy to manufacture, in series, typically by stamping thin light metal plates.

The invention also relates to another assembly comprising:

the thermal exchanger involved, and a thermally insulating housing containing this thermal exchanger and provided with walls containing at least one thermal insulator, collecting volumes of said at least first fluid being interposed between end openings of each free space and at least some of the walls of the housing through which inlet or outlet connections of said at least first fluid pass.

The walls containing the thermal insulator will have a VIP structure if a good compromise between thermal performance/weight/impact is to be achieved.

Also concerned is a thermal management installation comprising:

the above-mentioned thermal exchanger, with all or part of its characteristics, with this thermal exchanger being arranged at a crossing between a first circuit for the first fluid and a second circuit for the second fluid, in such a way:

that outside the thermal exchanger, the first and second fluids circulate independently in functional components (in an internal combustion engine, for example cylinders, an air/water radiator, a cylinder head, etc.) on which one and/or the other of the fluids act or with which they interact, and that, in the thermal exchanger, the first fluid can circulate in the first free space(s) and the second fluid can circulate in the second free space(s), means (such as one or more pump(s)) for circulating the first and second fluids in the first and second circuits respectively, and at least one valve placed at least on the second circuit of the second fluid, for:

at a first time (T1) of operation of the installation, allowing the first fluid to circulate alone in the thermal exchanger, without the second fluid, and at a second time (T2) of operation of the installation, allowing the first and second fluids to circulate together in the thermal exchanger.

In this installation, it may be preferred for the first and second fluids to be placed in direct thermal exchange through said additional thermally conductive wall, without interposing material for storing thermal energy between them. If necessary, the invention will be better understood and other characteristics, details and advantages thereof will become apparent upon reading the following description as a non-exhaustive example with reference to the appended drawings in which:

Figure 1:
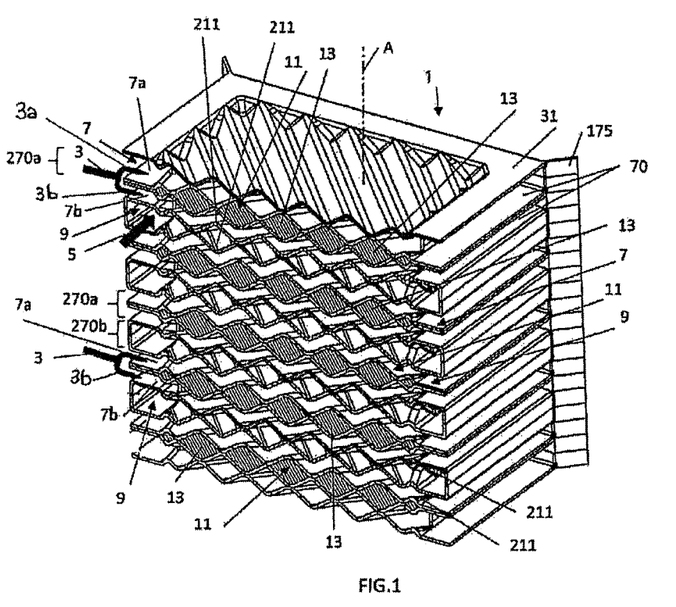
FIG. 1 is a diagram of an thermal exchanger according to the invention, in a pull-out view.

In particular, FIG. 1 shows an example of a thermal exchanger 1 allowing an exchange of heat energy between a first fluid 3 and a second fluid 5, which can be liquid and/or gaseous respectively.

The thermal exchanger 1 comprises:

at least a first free space 7 for the first fluid and at least a second free space 9 for the second fluid, in such a way that these first and second fluids circulate in the first and second free spaces, respectively, and at least one thermally conductive wall 11 which separates two adjacent free spaces 7, 9, in such a way that the exchange of heat between the first fluid 3 and the second fluid 5 occurs through the (each) wall 11 concerned.

The expression "at least one . . . free space" indicates that this space can have one or more volume(s).

Figure 6:
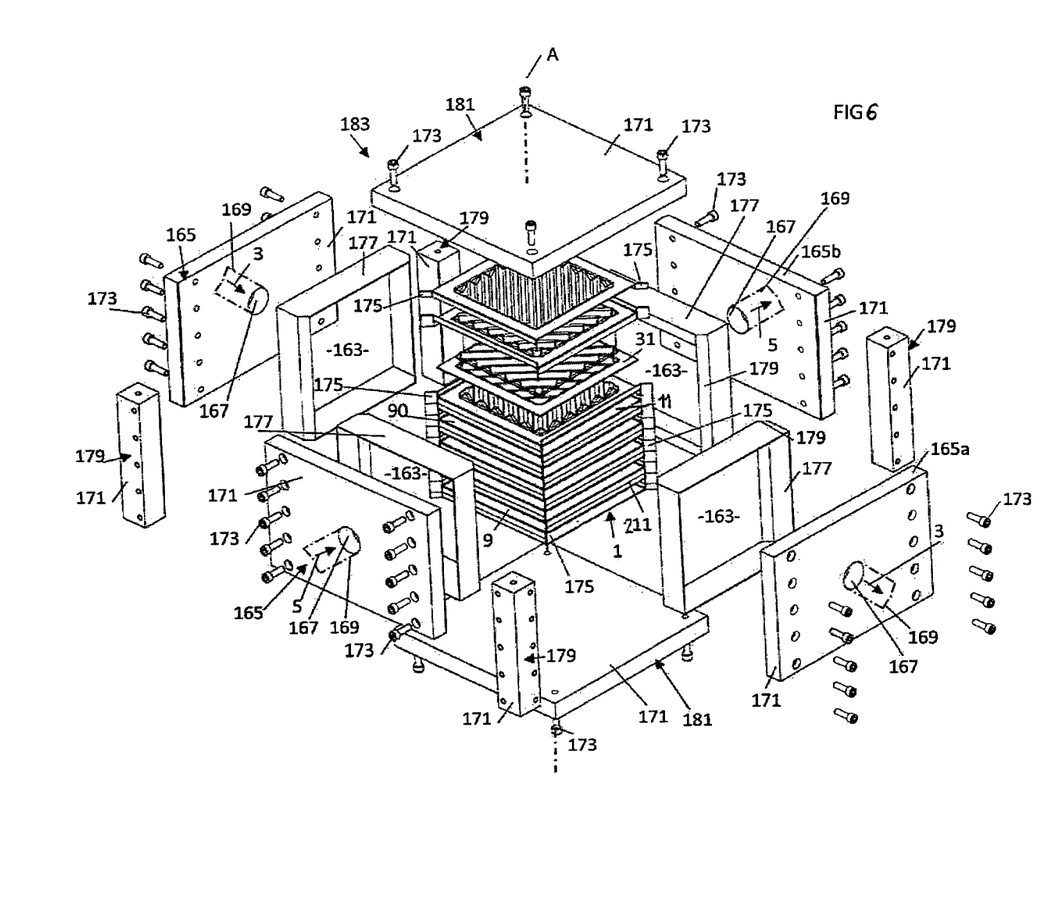
FIG. 6 is an exploded view thereof.

This is a situation where the thermal exchanger 1, the outer housing of which is not shown here (with collecting volumes 163, side walls 165 gone through by inlet pipes or outlet pipes 169 for fluid, and covers 181, in FIG. 6) is adapted so that the first free space 7 (stage 270*a*) is, in the thermal exchanger, divided into at least two sub-channels 7*a*, 7*b* wherein the (first) fluid 3 can circulate at the same time.

In the thermal exchanger, one said thermally conductive wall 11 which contains the material for storing thermal energy 13 which is therefore interposed between the two sub-channels 7*a*,7*b* extends between same two sub-channels 7*a*, 7*b*.

Thus, the first fluid 3 will divide, in the thermal exchanger, into several streams, here two parallel (sub)-channels (see arrows in FIG. 10), with the intermediate material 13 (typically containing PCM) becoming loaded with or releasing thermal energy, depending on the temperature of the first fluid 3.

All the stages of the thermal exchanger 1 could be like the stage 270*a* mentioned above.

However, it may be beneficial if a second fluid 5 could also circulate in the thermal exchanger 1, exchanging heat with the (first) fluid 3—stage 270*b*—with no mixing of such streams, as in the case illustrated in FIG. 1.

It is therefore proposed:

that the thermal exchanger 1 should further comprise at least a second free space 9 for the second fluid 5, in such a way that said first and second fluids 3, 5 circulate into the first and second free spaces, respectively, and that an additional thermally conductive 211 wall separates a first and a second adjacent free space 7, 9, in such a way that the heat exchange between the first and second fluids 3, 5 at two adjacent, successive, stages 270*a*, 270*b* occurs through this additional thermally conductive wall 211.

Between two sub-channels 7*a*, 7*b*, where the only first fluid 3 circulates, a material for storing thermal energy 13 will be interposed, whereas this will not be the case between the first and second channels 7, 9, where the first and second fluids 3, 5 respectively circulate, without mixing together, substantially transversely to each other. The additional thermally conductive wall 211, which is a double wall (two wall parts) and defines the second channel 9 between these two wall parts, is therefore devoid of material 13.

The thermally conductive wall 11 and additional thermally conductive wall 211 may be metallic.

The material 13 exchanges heat with the first two divided streams 3a, 3b. Using one or more PCM materials will make it possible to combine efficiency, limited weight, adaptability in the choice of shapes or even flexibility.

As a choice of this type of material, a rubber composition as described in EP2690137 or EP2690141 can be used. As an alternative solution, the material can be a fatty acid- or paraffin-based material.

The, or each thermally conductive wall 11, has a succession of recesses 15 inside which parts of the material 13 are arranged. Preferably, this should be coupled with a succession of bumps 17 on the outside of this wall.

With reference to FIGS. 2-5, a way of manufacturing the thermally conductive wall and additional thermally conductive 11, 211 of FIG. 1 will now be presented.

Figure 2:
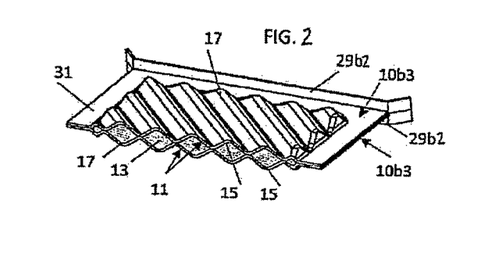
FIGS. 2 and 4 are sections along lines II-II and IV-IV respectively.
Figure 3:
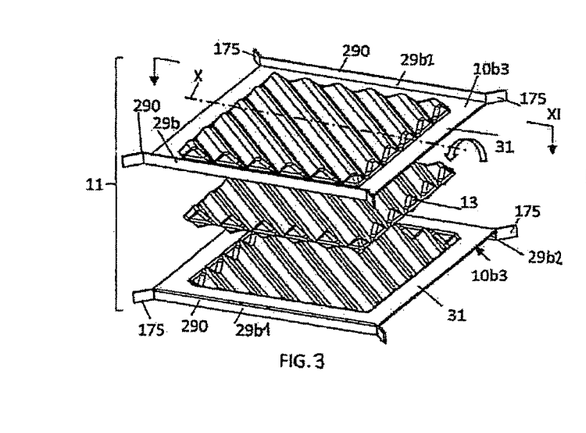
FIGS. 3 and 5 are each a view of a generally polygonal-shaped plate element that can define in elevation half of a stage of the thermal exchanger (respectively double walls 11 and 211 below)

The thermally conductive wall 11 of FIG. 2 is made as shown in FIG. 3, from two identical parallelepipedic plates 10b3, the two opposite edges 29b1, 29b2 of which are bent (at right angles) in the same direction.

The two plates are parallel. In the general plane of each plate, the frame 31 surrounds the central part with recesses 15 and bumps 17, again like a corrugated sheet.

Between the two plates 10b3 material 13 is interposed, here in the form of a succession of individualized blocks.

For assembly, one of the two plates is rotated by 180° relative to the other, about the X axis passing through the two opposite unfolded edges, with the edges 29b1, 29b2 being back to back. They are then sealingly assembled (typically by welding), by their frames 31 pressed against each other, after interposition of the material 13, so as to obtain the double-walled thermally conductive wall 11 of FIG. 2.

Figure 4:
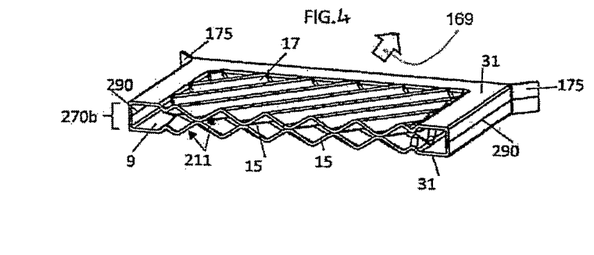
Figure 5:
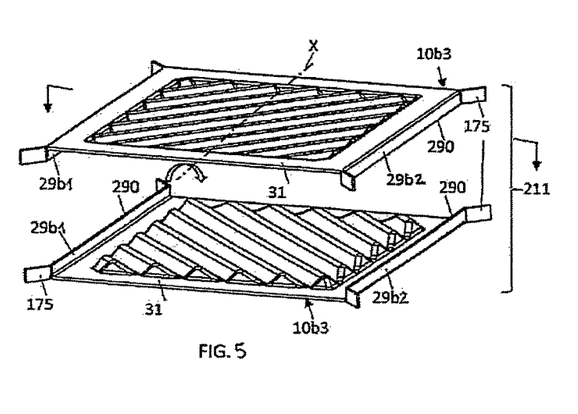

The additional thermally conductive wall 211 of FIG. 4 is made as shown in FIG. 5, from the two plates 10b3 with identically folded opposite edges.

Nothing is interposed between the two parallel plates 10b3.

For assembly, one of the two plates is rotated again by 180° with respect to the other, about the X axis passing through the two opposite unfolded edges, with the edges 29b1 or 29b2 facing each other. They are then sealingly assembled (typically by welding), by the ends 290 of their folded edges so as to create the channel 9 between the two plates.

If the corrugated sheet shape is planned, the corrugations cross from one plate to another, which advantageously increases the heat exchange surfaces.

A stage 270b is then created. To create an adjacent stage 270a, it is sufficient to place a double plate as thermally conductive 11 and another double plate as additional thermally conductive 211 coaxially parallel, so that they overlap, and then sealingly attach the two end lengths 290 of the first one (typically by welding) to the two opposite edges of the frame 31 facing same.

Two superimposed, crossed channels, insulated from each other and separated by a "simple" wall (without any material 13) are thus obtained.

If above the double plate thermally conductive wall 11, another double plate additional thermally conductive wall 211 is placed, oriented as the previous one and always fixed at the ends 290, then the two superimposed sub-channels 7a, 7b separated by the double plate thermally conductive wall 11 with the material 13 are created.

To avoid mixing the first and second fluids 3, 5 tabs 175 usefully form, in each corner, an edge parallel to the stacking direction A which makes it possible to obtain a multi-stage thermal exchanger and accumulator (see FIG. 1), having an alternation of channels or free spaces 7, 9, crossed with respect to each other and closed on two sides.

This thermal exchanger 1 can then be placed in the housing 183 as shown in FIG. 6, to collect the first and second fluid(s) at the inlet/outlet of the exchange plates and for a peripheral thermal insulation.

Figure 7:
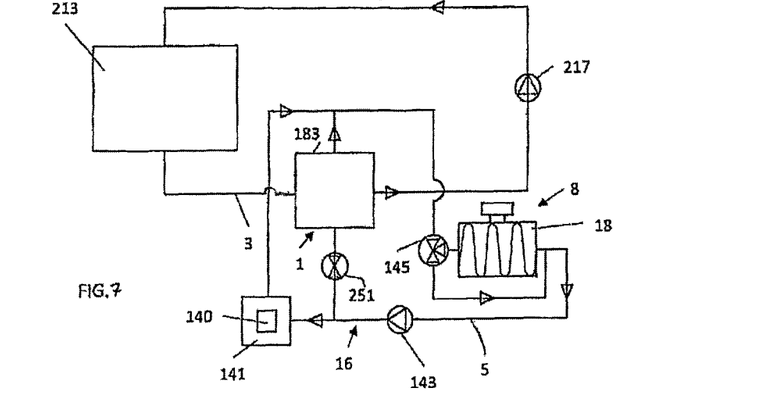
FIGS. 7 and 8 show two applications where the above-mentioned thermal exchangers can be used.
Figure 8:
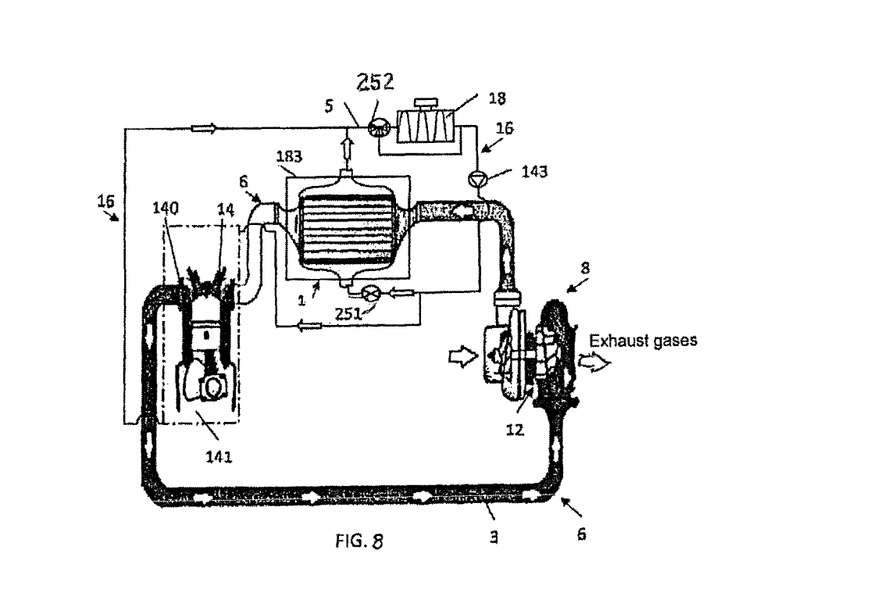

An operational application of this thermal exchanger and accumulator could be the following one, as shown in FIG. 7 or 8 on a thermal management installation comprising:

the thermal exchanger 1, at a crossing between a first circuit 6 for the first fluid 3 and a second circuit 16 for the second fluid 5, in such a way that outside the thermal exchanger, the first and second fluids circulate, independently from each other in functional components, such as combustion chamber 14, cylinders 140, 213 on which they act or with which they interact, and that, in said thermal exchanger, the first fluid 3 can circulate in the first free space(s) 7 and the second fluid 5 can circulate in the second free space(s) 9, means 12, 143, 217 for circulating the first and second fluids in the first and second channels (and in the thermal exchanger) respectively, and at least one valve 251 placed at least on the second circuit 16, for:

at a first time (T1) of operation of the installation, allowing the first fluid 3 to circulate alone in the thermal exchanger, without the second fluid 5, and at a second time (T2) of operation of the installation, allowing the first and second fluids to circulate together in the thermal exchanger.

Typically, this thermal management system is intended to be mounted on a motor engine 8, in particular an internal combustion engine.

Let us consider, in a first case, as in FIG. 7, a first circuit 6, for the oil of the motor engine (e.g. an automatic gearbox oil circuit 213) in the example and a second circuit 16 for water provided in the motor engine, in the example. Then the thermal exchanger 1 (FIG. 6) will be mounted at the intersection of the first and second circuits, as shown in FIG. 7.

As soon as the motor engine 8 is started, for example after the vehicle has been parked outside for 5-7 hours at 5° C., and when the material for storing thermal energy 13 of each of the thermally conductive walls 11 of the stages 270a is assumed to be in liquid phase, for example around 80-100° C., the oil circulates in the first circuit 6 via the oil pump 217.

At this so-called T1 point: the oil enters (as the first fluid 3) through the fluid inlet or outlet pipe 169 (FIG. 6) in the stages 270a of the thermal exchanger 1, for example around 6-8° C. It is heated there by PCM 13, when the access to the thermal exchanger is then prohibited for water from the second circuit 16 (as the second fluid 5), with the inlet valve 251 being closed.

With the motor engine 8 running, water then circulates in certain pipes and components of the vehicle (cylinders 14, cylinder head 141 for example) via the water pump 143 of the second circuit 16.

At this time, water 5 is still too cold to heat the oil. The thermostat 145 and the valve 251, then closed, force it to circulate only in the motor, without any circulation in the thermal exchanger 1.

Once the water reaches a temperature higher than that of the oil, the inlet valve 251 opens (and, when the time comes, the thermostat 145 passes the water through the radiator 18, if it is useful to cool it so that it does not exceed about 90° C., preferably). The second moment T2 has arrived, it being specified that another valve 252 can block a backflow of water to the thermal exchanger 1 (FIG. 8).

While oil continues to circulate in the stages 270a, the circulating water 5 now reaches the stages 270b through an independent fluid inlet or outlet pipe 169.

Oil is then heated by water, and possibly by the material 13 which gives it energy through the additional thermally conductive walls 211, as long as the PCM has not fallen below its state (phase) change temperature (of the order of 60-70° C. in the example).

The motor engine continues to warm up. Water now reaches the thermal exchanger 1 at 80° C. Oil continues to heat through the exchange with water 5, through the additional thermally conductive walls 211. Oil now reaches the thermal exchanger 1 at +70° C. Through this oil, the material 13 then becomes loaded with heat energy, which will then be available for the next engine operation, after another stop.

Warming on up in the motor engine, the temperature (t1) of oil 3 now exceeds 90 or even 100° C., thus the temperature (t2) of water 5.

To avoid overheating, oil then transfers thermal energy to water 5 (thermally conductive walls 11) and the material 13 (whenever possible) in the thermal exchanger 1.

In another case, as shown in FIG. 8, where, at the intersection of the first and second circuits, said thermal exchanger 1' (FIG. 1) will preferably be mounted, the second circuit 16, for water in the example, in connection with the first circuit 6, for air provided in the vehicle, will now be used in the motor engine 8 as the first circuit 6 on which a turbocharger 12 is mounted.

The vehicle is again assumed to have been parked, even in cold weather (negative temperature in winter), motor engine 8 stopped, for 5-6 hours. If, during its operation before this shutdown, the motor engine 8 ran for example 10-15 min with its turbo 12 running, the PCM 13 has exceeded its state change temperature and is therefore, in the example, above its liquefaction temperature.

Especially with the thermal insulation of the housing 183 and the multiple stages of the thermal exchanger 1, it is ready, for a certain time (5-6 hours in the example), to heat the first fluid 3 (here air) when the motor engine starts next.

This motor engine start occurs then. The turbocharger 12 is still off. Outside air 3, still relatively cold from the first circuit 6, for air in the example, to the combustion chamber(s) 14/cylinders 140 of the motor engine 8, then circulates through the stages 270a.

The first moment T1 then comes: the valve 251 is closed and forces the water from the second circuit 16 to circulate only in the motor, except for the thermal exchanger 1. Thus, since water is still cold, air is prevented from losing calories in a heat exchange between same, while it has heated up in the exchange with the material 13 that is hotter than air.

Having been heated from 5° C. to 40° C., for example, this air will be able to advantageously supply the combustion chamber(s) 14/cylinders 140.

A few minutes (3 to 4 for example) after this first phase following the motor engine start, the turbocharger 12 starts. An immediate rise in pressure and temperature (above 150° C.) of air (oxidizer) in the first circuit 6 occurs.

However, supplying the cylinders 140 of the combustion chamber 14 at such temperatures is inappropriate: too high thermal constraints, drop in efficiency . . . . It is recommended to do this around 100-130° C. and preferably around 110° C.

In addition, since the motor engine 8 is already operating, and thus the channel 16 is active, for a few minutes, water (as a cooling liquid for the relevant parts of the motor engine) is already relatively hot in the channel 16 even if the temperature around is cold. As a matter of fact, for example, an motor engine thermostat, then closed, could have forced the water to circulate only in the motor engine, without therefore temporarily circulating in the motor engine thermal exchanger (which can be a radiator) 18. This water will have quickly warmed up as it circulated around the cylinders 140 and in the cylinder head 141 of the motor engine 8 before returning to the water pump 143.

Thus, it is reasonable to consider a rise in water temperature up to 40-60° C. at that time.

The cycle of said moment T2 in the thermal exchanger 1 can occur, especially since this second fluid 5 is at the moment T2 at a favourable temperature (50° C. for example) to reduce that of air from the turbo 12 which, when passing through the stages 270a, was able to supply thermal energy to the material 13.

With these two, here simultaneous, thermal exchanges, it can be considered that at the same time T2, while at the exit of turbo 12 the compressed air (for example towards $2 \times 10^5$ Pa in absolute pressure) is at a temperature of 170-190° C., it can go down to 110-120° C. after the exchange, in the thermal exchanger 1, with the material 13 and water 5.

Referring again to FIGS. 1 and 6, it should be noted that with a stacking in a direction A of elements corresponding to a staged and alternating succession of hollow thermally conductive walls 11, with cells containing material 13, and hollow additional thermally conductive walls 211 with no such material, it will be possible to create a succession of free spaces 7 then 9, stage after stage.

The first and second fluids 3, 5 will therefore circulate in the free spaces 7, 9 on one stage out of two, here in two transverse directions, each perpendicular to the axis A.

One collecting volume 163 per side face stands around this stack, as illustrated specifically in FIG. 6.

Each series of free space stages 7 (respectively 9) communicates upstream (with respect to the direction of circulation of the fluid under consideration) with a first collecting volume 163 and, downstream, with a second collecting volume 163 located on the opposite side face.

Externally, each collecting volume 163 is limited by a side wall 165.

Each side wall 165 will preferably be traversed at 167 by a passage, thus communicating with a collecting volume 163 to be connected to an inlet pipe or outlet pipe 169, for the first fluid 3 or second fluid 5.

Moreover, each side wall 165 will preferably contain a thermally insulating material 171.

Between two adjacent side faces, such as 165a, 165b, the collecting volumes 163 are fluidically isolated from each other.

To obtain a complete block, i.e. a multi-stage exchanger-accumulator, it will therefore be sufficient, as shown in FIGS. 1 and 6, to superimpose elements with alternating thermally conductive walls 11 and additionally thermally conductive 211 and plates welded together along the folded edges and vertical tabs 175. An alternation of free channels or spaces 7, 9, crossing one with another and closed on two opposite sides, is thus obtained.

The final step of realisation embodiment of the block will then pass through an interface with the side walls 165, for the peripheral sealing, and thus the insulation between the collecting volumes 163.

Rather than a direct engagement with these walls, what is proposed here is that the axial (thus vertical in this case) lines of the tabs 175 fastened to each other engage between two, for example bevelled, vertical corners 179 of intermediate frames 177.

The intermediate frames 177 will then be laterally interposed between the stack of plates 100 and the opposite side wall 165.

In the lateral corners, pillars 179 stand axially between two adjacent side walls 165, or, as in the example shown, between two adjacent lateral intermediate frames 177, the whole assembly then being covered by the side walls 165.

Fixing means, such as screws 173, may unite the whole assembly, in this case engaged in the side walls 165 and the corner pillars 179.

Transversally to the axis A, in this case above and below same, solid cover plates 181 are involved in the closing, thus preferably sealed and thermally insulated, of the collecting volumes 163. Like the walls 165, the plates 181 each preferably contain a thermally insulating material 171.

As a matter of fact, it is advised that (preferably all) such walls 165 and plates 181 should have a VIP structure. The passages for the fluid inlet or outlet pipes 169 and screws 173 will then be sealed.

The pillars 179 may not consist of VIP structure.

Once the whole is assembled and fastened, the operational housing 183 forming a thermally-efficient exchanger-accumulator is thus obtained. One advantage of the VIP solution is that it limits the thickness of the thermally insulating material 171, and thus the internal volume of the housing available for the thermal exchanger, or the overall volume of the housing can thus be increased. Better insulation and/or limited weight can also be expected.

The invention claimed is:

1. A thermal exchanger for implementing a thermal exchange between a first fluid and a second fluid, said thermal exchanger comprising successively, in a stacking direction and oriented transversely to said stacking direction:
   first free spaces for the first fluid;
   thermally conductive walls that each at least locally delimit at least one of said first free spaces, in such a way that an exchange of heat can occur between said first fluid and said thermally conductive walls, the thermally conductive walls having a top wall and a bottom wall between which is arranged a thermal energy storage material adapted for storing thermal energy by accumulation of latent heat, the thermal energy storage material being disposed in heat exchange with at least said first fluid through at least one of said top and bottom walls, with said first free spaces being, in the heat exchanger, individually divided into at least two separated channels in which two streams of the first fluid can circulate at the same time but separately, with one of said thermally conductive walls being interposed between the two channels;
   second free spaces for the second fluid, in such a way that the first fluid and the second fluid can flow into the first and second free spaces, respectively; and
   additional thermally conductive walls each arranged to separate successive first and second free spaces from each other such that the exchange of heat between said first fluid and the second fluid occurs through said additional thermally conductive walls,
wherein:
   in the first free spaces, only one of said thermally conductive walls containing the thermal energy storage material separates the two channels, in such a way that two streams of the first fluid can individually exchange heat with the thermal energy storage material directly through only one of said thermally conductive walls,
   the thermally conductive walls and additional thermally conductive walls are arranged such that the heat exchange between the second fluid and the thermal energy storage material of each thermally conductive wall occurs:
      in a first area of the thermally conductive wall, successively through one of said additional thermally conductive walls in contact with said second fluid, one of said two channels of one of said first free spaces and one of the top wall and bottom wall, and
      in a second area of the thermally conductive wall, successively through one of said additional thermally conductive walls in contact with said second fluid and one of the top wall and bottom wall, and
   the heat exchange between the second fluid and the thermal energy storage material in the second area does not occur through the first fluid.

2. An assembly comprising:
   the thermal exchanger according to claim 1; and
   a thermally insulating housing containing the thermal exchanger and provided with walls containing at least one thermal insulator, with volumes for collecting at least said first fluid being interposed between end openings of each of the at least two separated channels and at least some of the walls of the thermally insulating housing through which inlet connections or outlet connections of said first fluid, for some of the inlet connections and/or outlet connections, and of said second fluid for others of the inlet connections and/or outlet connections, pass.

3. A method of thermal management, the method comprising:
   using the thermal exchanger according to claim 1, the thermal exchanger being arranged at a crossing between a first circuit for the first fluid and a second circuit for the second fluid,
   connecting at least one of said at least two separated channels to the first circuit, and another of the at least two separated channels to the second circuit, so that:
      outside the thermal exchanger, the first fluid and the second fluid can circulate independently in functional components disposed, for some of them on the first circuit and for others on the second circuit, and on which the first fluid and the second fluid respectively act or with which the first fluid and the second fluid respectively can interact,
      in the thermal exchanger, the first fluid can circulate in the second channel and the second fluid can circulate in the first channel,
   while circulating the first fluid and the second fluid, in the first and second circuits, respectively, including the functional components:
      at a first time of operation, allowing the first fluid to circulate alone in the thermal exchanger, without the second fluid, and
      at a second time of operation, allowing the first fluid and the second fluid to circulate together in the thermal exchanger.

4. The thermal exchanger of claim 1, wherein the second area is defined by corrugations in the one of said additional thermally conductive walls and said one of the top wall and bottom wall.

5. The thermal exchanger of claim 4, wherein second area is defined by an area of contact between the corrugation in the one of said additional thermally conductive walls and the corrugation said one of the top wall and bottom wall.

6. The thermal exchanger of claim 1, wherein the additional thermally conductive walls each have a first end and a second end opposite the first end such that the respective successive first and second free spaces are separated along the length of the additional thermally conductive wall from the first end to the second end.

* * * * *